(12) United States Patent
Kan et al.

(10) Patent No.: US 10,101,856 B2
(45) Date of Patent: Oct. 16, 2018

(54) OPTICAL TOUCH APPARATUS AND A METHOD FOR DETERMINING A TOUCH POSITION

(71) Applicant: Wistron Corporation, New Taipei (TW)

(72) Inventors: Wei-Kuo Kan, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 147 days.

(21) Appl. No.: 14/944,225

(22) Filed: Nov. 18, 2015

(65) Prior Publication Data
US 2017/0083162 A1    Mar. 23, 2017

(30) Foreign Application Priority Data
Sep. 21, 2015 (TW) .............................. 104131160 A

(51) Int. Cl.
*G06F 3/042* (2006.01)
*G06F 3/041* (2006.01)

(52) U.S. Cl.
CPC .......... *G06F 3/0428* (2013.01); *G06F 3/0418* (2013.01)

(58) Field of Classification Search
None
See application file for complete search history.

(56) References Cited

U.S. PATENT DOCUMENTS

| 6,429,856 | B1* | 8/2002 | Omura | G06F 3/0416 |
| | | | | 178/18.09 |
| 8,115,753 | B2* | 2/2012 | Newton | G06F 3/0421 |
| | | | | 178/18.09 |
| 2001/0002694 | A1* | 6/2001 | Nakazawa | G06F 3/0423 |
| | | | | 250/221 |

(Continued)

FOREIGN PATENT DOCUMENTS

| TW | 201015507 | 4/2010 |
| TW | 201030578 | 8/2010 |
| TW | 201241696 | 10/2012 |

OTHER PUBLICATIONS

"Office Action of Taiwan Counterpart Application" with partial English translation, dated Mar. 11, 2016, p. 1-p. 14, in which the listed references were cited.

*Primary Examiner* — Dorothy Harris
(74) *Attorney, Agent, or Firm* — JCIPRNET

(57) ABSTRACT

An optical touch apparatus configured to sense a touch operation of a touch object is provided. The optical touch apparatus includes a touch operation surface, a plurality of optical sensors and a touch controller. The touch operation surface includes a plurality of reference points. The touch object performs the touch operation on the touch operation surface. The optical sensors are disposed on a side of the touch operation surface and configured to obtain a plurality of images from different angles. The touch controller is electrically connected to the optical sensors and configured to determine a plurality of orientation points according to the images obtained by the optical sensors. The touch controller compares the orientation points to the reference points and determines a touch position of the touch object on the touch operation surface according to a comparison result. Furthermore, a method for determining a touch position is also provided.

12 Claims, 3 Drawing Sheets

(56) References Cited

U.S. PATENT DOCUMENTS

| | | | |
|---|---|---|---|
| 2002/0075243 A1* | 6/2002 | Newton | G06F 3/0421 |
| | | | 345/173 |
| 2006/0232830 A1* | 10/2006 | Kobayashi | G06F 3/0421 |
| | | | 358/448 |
| 2010/0079412 A1* | 4/2010 | Chiang | G06F 3/0428 |
| | | | 345/175 |
| 2010/0201812 A1* | 8/2010 | McGibney | G06F 3/0416 |
| | | | 348/143 |
| 2010/0207912 A1 | 8/2010 | Wu et al. | |
| 2010/0328243 A1* | 12/2010 | Wang | G06F 3/0423 |
| | | | 345/173 |
| 2011/0074674 A1* | 3/2011 | Walberg | G06F 3/0418 |
| | | | 345/158 |
| 2012/0044213 A1* | 2/2012 | Lu | G01S 7/491 |
| | | | 345/175 |
| 2012/0181418 A1* | 7/2012 | Kitagawa | G06F 3/0416 |
| | | | 250/206.1 |
| 2013/0038577 A1* | 2/2013 | Chen | G06F 3/042 |
| | | | 345/175 |
| 2013/0241883 A1* | 9/2013 | Leung | G06F 3/0425 |
| | | | 345/175 |
| 2013/0257822 A1* | 10/2013 | Holmgren | G06F 3/0418 |
| | | | 345/178 |
| 2014/0015802 A1* | 1/2014 | Lu | G06F 3/042 |
| | | | 345/175 |
| 2015/0097811 A1* | 4/2015 | Wei | G06F 3/042 |
| | | | 345/175 |

* cited by examiner

OPTICAL TOUCH APPARATUS AND A METHOD FOR DETERMINING A TOUCH POSITION

CROSS-REFERENCE TO RELATED APPLICATION

This application claims the priority benefit of Taiwan application serial no. 104131160, filed on Sep. 21, 2015. The entirety of the above-mentioned patent application is hereby incorporated by reference herein and made a part of this specification.

BACKGROUND OF THE INVENTION

Field of the Invention

The present invention relates to a touch apparatus and a method for determining a position, and more particularly relates to an optical touch apparatus and a method for determining a touch position.

Description of Related Art

Generally, optical touch systems can be classified into two types, a blocking type or a non-blocking type. A blocking optical touch system is based on the principle of signal blocking that a touch object blocks a light signal emitted from a light source (e.g., a string of light emitting diodes or a reflective strip), and optical sensors in the blocking optical touch system sense a shadow having a lower brightness relative to the background of the touch object, such that an occurring position of the touch object and its corresponding touch operation can be determined. On the other hand, a non-blocking optical touch system usually includes an optical touch stylus or the use of a finger which is configured to perform a touch operation on a flat panel display so as to transmit a light signal to the optical sensors. For example, in the non-blocking optical touch system using the optical touch stylus, according to the type of the optical touch stylus, the light signal transmitted from the optical touch stylus to the optical sensors may be actively generated from the internal of the optical touch stylus, or generated by the optical touch stylus reflecting back the light signal transmitted by a light source attached to each optical sensor. Therefore, the optical sensors can determine the occurring position of the touch object and its corresponding touch operation according to the received light signal having a higher brightness relative to the background.

However, in a touch operation surface of the existing optical touch system, the area close to the boundary usually needs a calibration mode to solve a problem that the touch position is not accurately determined in this area. The principle of the calibration mode is mainly about subtracting the actual coordinate from the theoretical coordinate to obtain a difference, and then updating the actual coordinate. From another point of view, a known calibration point is displayed in the touch operation surface, and then the calibration point is clicked to obtain the actual coordinate, the differences obtained from the subtracting calculation are used for updating. However, in some specific application scenarios, this method cannot solve the problem that the touch position is not accurately determined.

SUMMARY OF THE INVENTION

The invention provides an optical touch apparatus and a method for determining a touch position, which improve the determining accuracy of the touch position.

The optical touch apparatus of the invention is configured to sense a touch operation of a touch object. The optical touch apparatus includes a touch operation surface, a plurality of optical sensors and a touch controller. The touch operation surface includes a plurality of reference points. The touch object performs the touch operation on the touch operation surface. The optical sensors are disposed on a side of the touch operation surface and configured to obtain a plurality of images from different angles of the touch object. The touch controller is electrically connected to the optical sensors and configured to determine a plurality of orientation points according to the images obtained by the optical sensors. The touch controller compares the orientation points to the reference points and determines a touch position of the touch object on the touch operation surface according to a comparison result.

A method for determining a touch position in the invention is configured to determine a touch position of a touch object. The optical touch apparatus includes a touch operation surface and a plurality of optical sensors. The method for determining the touch position comprises: obtaining a plurality of images from different angles of the touch object by using the optical sensors; determining a plurality of orientation points according to the images, and comparing the orientation points to a plurality of reference points; and determining the touch position of the touch object on the touch operation surface according to a comparison result.

Based on the above, the touch controller performs the comparison according to the reference points and the orientation points which are determined by the images obtained by the optical sensors, and determines the touch position of the touch object on the touch operation surface according to the comparison result, so as improve the determining accuracy of the touch position.

In order to make the aforementioned and other features and advantages of the invention more comprehensible, embodiments accompanying figures are described in details below.

DESCRIPTION OF THE EMBODIMENTS

Several embodiments are provided below to describe the invention; however, the invention should not be limited to the embodiments given herein. The embodiments described below can be combined with each other if deemed proper. The term "coupling/coupled" used in this specification (including claims) may refer to any direct or indirect connection means. For instance, in the description and claims, if a first apparatus is coupled to a second apparatus, it means that the first apparatus may be directly connected to the second apparatus or may be indirectly connected to the second apparatus through another apparatus or by another connection means. In addition, the term "signal" may stand for at least one current, voltage, electric charge, temperature, data, electromagnetic wave, or any other signal or signals.

Figure 1:
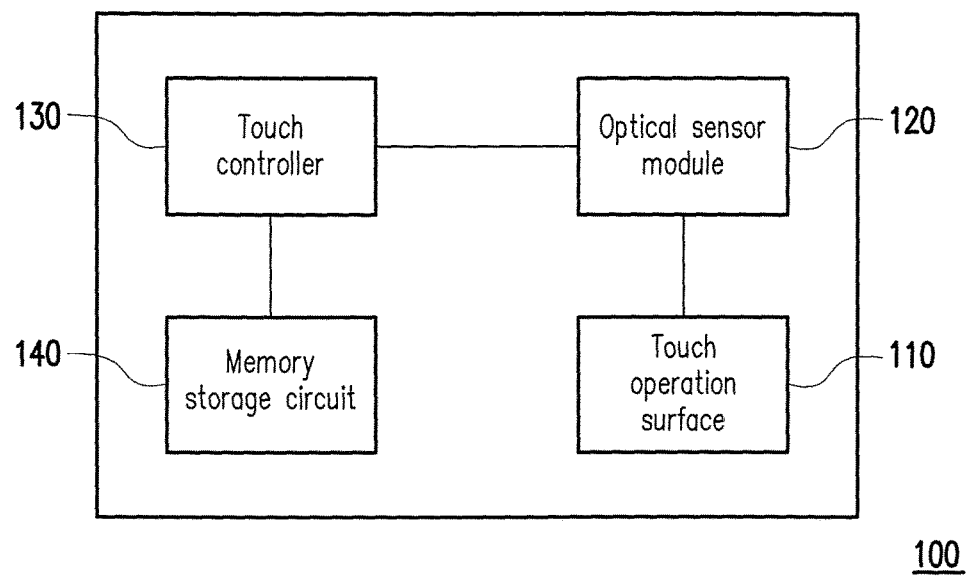
FIG. 1 is a schematic block diagram depicting an optical touch apparatus of one embodiment of the invention.
Figure 2:
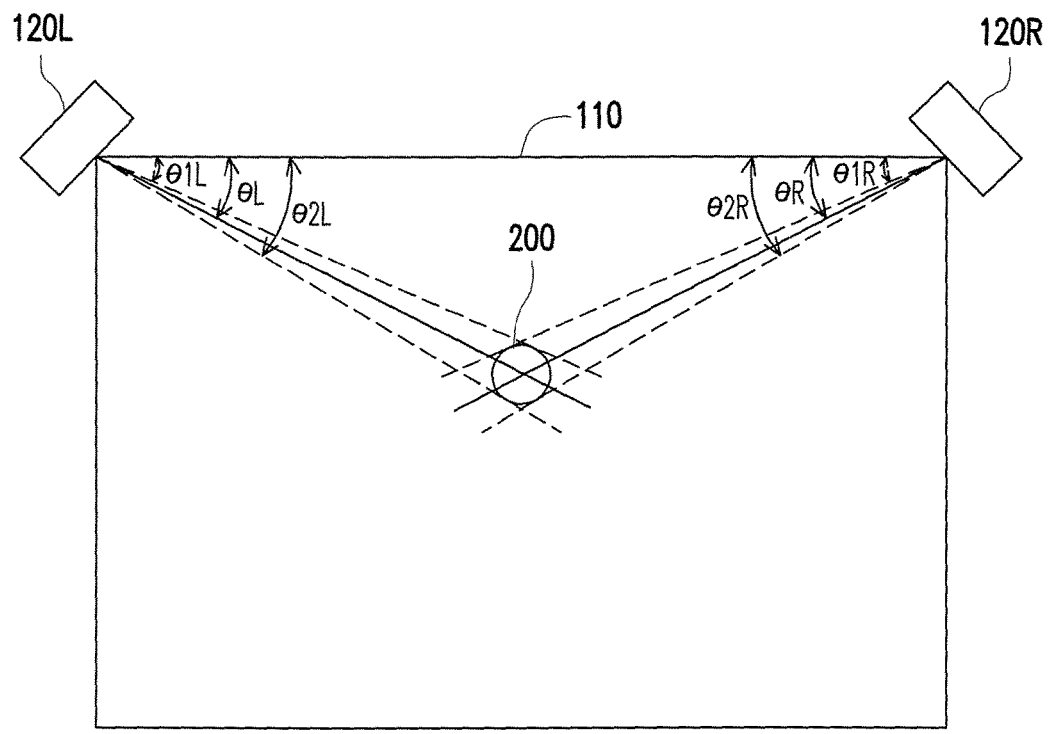
FIG. 2 is a schematic view depicting the configuration of a touch operation surface and optical sensors of the embodiment in FIG. 1.

FIG. 1 is a schematic block diagram depicting an optical touch apparatus of one embodiment of the invention. FIG. 2 is a schematic view depicting the configuration of a touch operation surface and optical sensors of the embodiment in FIG. 1. Referring to FIG. 1 to FIG. 2, the optical touch apparatus 100 of the present embodiment includes a touch operation surface 110, an optical sensor module 120, a touch controller 130, and a memory storage circuit 140. The touch object 200 performs a touch operation on the touch operation surface 110. In the present embodiment, the touch operation surface 110 is, for example, a front surface of a flat panel display with frame, or a flat panel display without frame, or a curved surface display, but the invention is not limited thereto, the surface, which may display or project messages, of other devices such as a display, a television, a banner, and an electronic whiteboard may also be appropriate.

In the present embodiment, the optical sensor module 120 includes a first optical sensor 120L and a second optical sensor 120R, which are, for example, disposed on the upper side of the touch operation surface 110 as shown in FIG. 2, but the invention is not limited thereto. In other embodiments, the first optical sensor 120L and the second optical sensor 120R are also disposed on one of the lower side, the left side and the right side of the touch operation surface 110. In the present embodiment, the first optical sensor 120L and the second optical sensor 120R are configured to obtain a plurality of images from different angles $\theta L$ and $\theta R$ of the touch object 200. Take a blocking optical touch system as an example, the touch object 200 blocks a light signal emitted from a light source (e.g., a string of light emitting diodes or a reflective strip), and the first optical sensor 120L and the second optical sensor 120R sense the shadow having a lower brightness relative to the background of the touch object 200, so as to obtain the images from different angles $\theta L$ and $\theta R$ of the touch object 200. In the present embodiment, the touch controller 130 is configured to determine a plurality of orientation points according to the images obtained by the first optical sensor 120L and the second optical sensor 120R, and to determine the touch position of the touch object 200 on the touch operation surface 110 according to the orientation points and the reference points.

Figure 3:
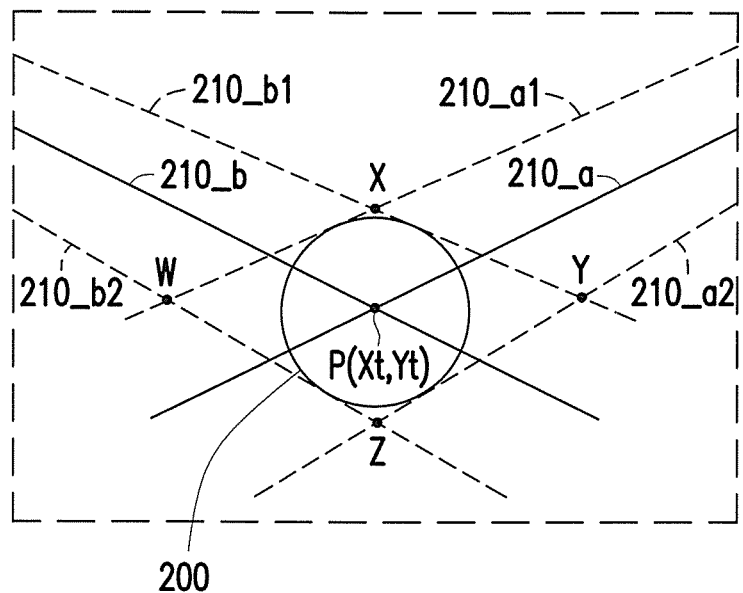
FIG. 3 is an enlarged schematic view depicting the surroundings of a touch object of the embodiment in FIG. 2.
Figure 4:
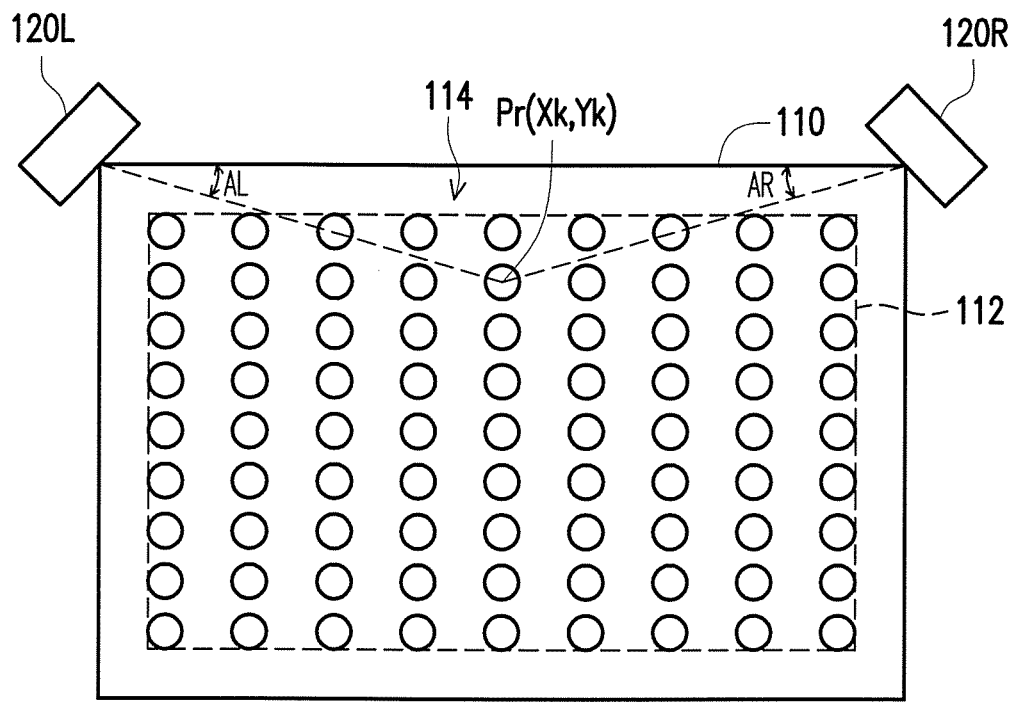
FIG. 4 is a schematic view depicting the touch operation surface and the distribution of reference points of the embodiment in FIG. 2.

To be more specific, FIG. 3 is an enlarged schematic view depicting the surroundings of a touch object of the embodiment in FIG. 2. FIG. 4 is a schematic view depicting the touch operation surface and the distribution of reference points of the embodiment in FIG. 2. Referring to FIGS. 1 to 4, in the present embodiment, the touch operation surface 110 includes a plurality of reference points Pr, and the coordinate (Xk, Yk) of each of the reference points Pr is changed according to a different position of the reference point Pr. The memory storage circuit 140 is configured to store the position information of each of the reference point Pr, such as including the coordinate (Xk, Yk) or included angles AL and AR (reference included angles) between the upper side of the touch operation surface 110 and connecting lines from the reference point Pr to different optical sensors. In the present embodiment, the touch operation surface 110, for example, includes a displayed area 112 and a non-displayed area 114. The reference points Pr are, for example, distributed inside the displayed area 112, but the invention is not limited thereto. In one embodiment, the reference points Pr may also be distributed inside the non-displayed area 114. In addition, in one embodiment, when setting up the first optical sensor 120L and the second optical sensor 120R, the reference points Pr distributed in the displayed area 112 may be used for adjusting the positions of the first optical sensor 120L and the second optical sensor 120R or sensing angles, the invention is not limited thereto.

In the present embodiment, the reference points Pr, for example, may serve as reference bases when the touch controller 130 determines the touch position of the touch object 200, and the reference points Pr may be, for example, represented as data stored in the memory storage circuit 140. Therefore, when the touch object 200 actually performs the touch operation on the touch operation surface 110, the display quality of the touch operation surface 110 is not affected by the reference points Pr. For example, the user cannot see the reference points Pr on the touch operation surface 110. In addition, in FIG. 4, the number, the disposed position, and the size of the reference points Pr are only used for illustration, the invention is not limited thereto.

In the present embodiment, the touch controller 130, for example, compares the positions of the orientation points W, X, Y and Z to the position of at least one reference point Pr, so as to determine which reference point Pr is closest to each of the orientation points. Subsequently, the touch controller 130 determines the coordinate values of the touch position of the touch object 200 on the touch operation surface 110 according to the comparison result.

To be more specific, in the present embodiment, the first optical sensor 120L and the second optical sensor 120R obtain the images from different angles $\theta L$ and $\theta R$ of the touch object 200. Take the first optical sensor 120L as an example, after obtaining the images, the first optical sensor 120L transmits the corresponding sensing signals to the touch controller 130, so that the touch controller 130 determines the center and the boundary of the touch object 200 based on the sensing signals. The determining result is shown in FIG. 3, the touch controller 130 may obtain a center connecting line 210_b and boundary connecting lines 210_b1 and 210_b2 of the touch object 200 and the first optical sensor 120L (the first boundary connecting line). In the present embodiment, the boundary connecting lines 210_b1 and 210_b2, for example, form first orientation included angles $\theta 1L$ and $\theta 2L$ with the upper side of the touch operation surface 110 with respect to the first optical sensor 120L, namely the included angles between the boundary connecting lines 210_b1 and 210_b2 and the upper side of the touch operation surface 110, but the invention is not limited thereto. In one embodiment, the first orientation included angles $\theta 1L$ and $\theta 2L$ may also be the included angles between the boundary connecting lines 210_b1 and 210_b2 and the left side of the touch operation surface 110 at the first optical sensor 120L.

Similarly, in the present embodiment, from an angle $\theta R$ of view, the touch controller 130 may obtain a center connecting line 210_a and boundary connecting lines 210_a1 and 210_a2 of the touch object 200 and the second optical sensor 120R (the second boundary connecting line) by using the second optical sensor 120R. In the present embodiment, the boundary connecting lines 210_a1 and 210_a2, for example, form second orientation included angles $\theta 1R$ and $\theta 2R$ with the upper side of the touch operation surface 110 with respect to the second optical sensor 120R, namely the included angles between the boundary connecting lines 210_a1 and 210_a2 and the upper side of the touch operation surface 110.

In the present embodiment, the intersection points of the boundary connecting lines 210_a1, 210_a2, 210_b1 and 210_b2, for example, include the orientation points W, X, Y and Z. Therefore, the touch controller 130, for example, determines the boundary connecting lines 210_a1, 210_a2, 210_b1 and 210_b2 according to the images obtained by the first optical sensor 120L and the second optical sensor 120R from different angles θL and θR, so as to determine the positions of the orientation points W, X, Y and Z of the touch object 200.

In addition, in the present embodiment, the touch controller 130 calculates coordinate (Xt, Yt) of the touch position P before calibration according to the center connecting lines 210_a and 210_b. Subsequently, the touch controller 130 determines whether to replace the coordinate of the touch position P before calibration with the coordinate of the reference point Pr closest to the orientation points W, X, Y and Z according to the comparison result between the positions of the orientation points W, X, Y and Z and the position of at least one reference point Pr, so as to obtain the coordinate (Xt, Yt), (Xk, Yk), (Xt, Yk), or (Xk, Yt) of the touch position P after calibration.

To be more specific, in the present embodiment, after obtaining the first orientation included angles θ1L and θ2L and the second orientation included angles θ1R and θ2R, the touch controller 130 compares the orientation included angles to the reference included angles AL and AR of the reference point Pr, so as to determine the reference point Pr closest to each of the orientation points. Take the orientation point W as an example, the corresponding orientation included angles of the orientation point W are, for example, the first orientation included angle θ2L and the second orientation included angle θ1R respectively. In one embodiment, by comparison, if the first orientation included angle θ2L and the second orientation included angle θ1R are equal to the reference included angles AL and AR of the reference point Pr respectively, it means that the reference point closest to the orientation point W is the reference point Pr, and the orientation point W and the reference point Pr are overlapped. In one embodiment, by comparison, if at least one of the first orientation included angle θ2L and the second orientation included angle θ1R are not equal to the reference included angles AL and AR of the reference point Pr respectively, for example, the first orientation included angle θ2L is not equal to the reference included angle AL, the touch controller 130 selects another reference point Pr having the smallest difference between the reference included angle AL and the first orientation included angle θ2L to serve as the reference point closest to the orientation point W. In addition, for example, when the second orientation included angle θ1R is not equal to the reference included angle AR, the touch controller 130 selects another reference point Pr having the smallest difference between the reference included angle AR and the second orientation included angle θ1R to serve as the reference point closest to the orientation point W.

Similarly, the touch controller 130 may also determine the reference point Pr closest to each of the orientation points X, Y and Z by comparing between the orientation included angles and the reference included angles AL and AR of the reference point Pr. It should be noted here, in the present embodiment, considering different orientation points, the reference points Pr closest to each of the orientation points respectively may be the same or may be different, the invention is not limited thereto. In addition, considering an orientation point, the reference points Pr closest to each of the orientation points respectively may or may not overlap with the orientation points, the invention is not limited thereto.

Subsequently, in the present embodiment, after deciding the reference point Pr closest to the orientation points W, X, Y and Z, the touch controller 130 determines whether to replace the coordinate (Xt, Yt) of the touch position P before calibration with the reference point Pr closest to the orientation points W, X, Y and Z according to the reference points Pr closest to the orientation points W, X, Y and Z. For example, the touch controller 130 may replace the coordinate value Yt of the Y coordinate of the touch position P before calibration with the coordinate value Yk of the Y coordinate of the reference point Pr closest to the orientation point W or Y. Similarly, the touch controller 130 may replace the coordinate value Xt of the X coordinate of the touch position P before calibration with the coordinate value Xk of the X coordinate of the reference point Pr closest to the orientation point X or Z. In other words, in the present embodiment, the touch controller 130, for example, determines the coordinate value Yk of the touch position P in the Y direction according to the orientation point W or Y arranged along X direction. In addition, the touch controller 130, for example, determines the coordinate value Xk of the touch position P in the X direction according to the orientation point X or Z arranged along Y direction.

Therefore, in the present embodiment, the touch controller 130 may replace the coordinate (Xt, Yt) of the touch position P before calibration with the coordinate of the reference point Pr closest to the orientation points W, X, Y and Z, so as to obtain the coordinate (Xt, Yt), (Xk, Yk), (Xt, Yk), or (Xk, Yt) of the touch position P after calibration. In the present embodiment, the coordinate values Xt and Yt of the coordinate (Xt, Yt) of the touch position P before calibration may or may not be replaced by one or both of the coordinate values Xk and Yk, but the invention is not limited thereto. Therefore, the touch controller 130 determines the touch position P of the touch object 200 on the touch operation surface 110 by the above-mentioned method, so as to improve the determining accuracy.

Figure 5:
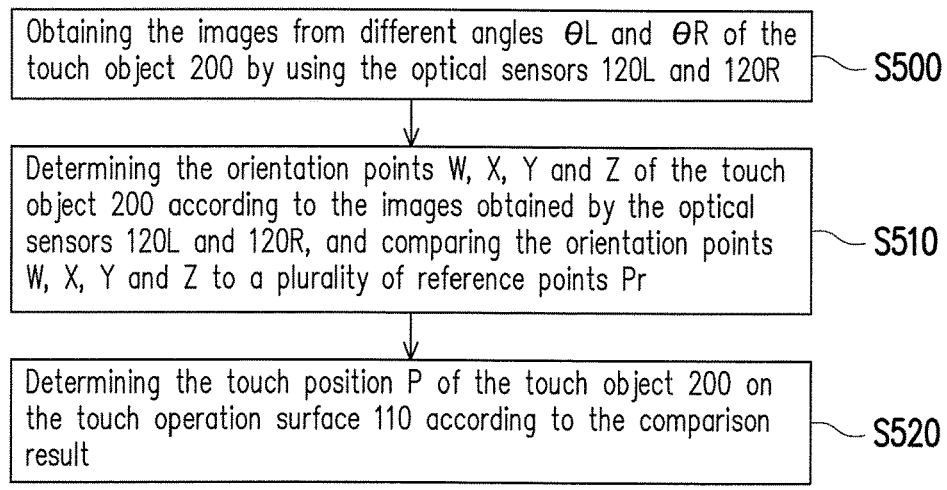
FIG. 5 is a flow chart of steps depicting a method for determining a touch position of one embodiment of the invention.

FIG. 5 is a flow chart of steps depicting a method for determining a touch position of one embodiment of the invention. Referring to FIGS. 1 to 5, the method for determining the touch position of the present embodiment is at least applicable to the optical touch apparatus 100 of the embodiment in FIGS. 1 to 4, so as to determine the touch position P of the touch object 200. In the present embodiment, in step S500, the touch controller 130 uses the optical sensors 120L and 120R to obtain the images from different angles θL and θR of the touch object 200. Subsequently, in step S510, the touch controller 130 determines the orientation points W, X, Y and Z of the touch object 200 according to the images obtained by the optical sensors 120L and 120R, and then compares the orientation points W, X, Y and Z to a plurality of reference points Pr. After that, in step S520, the touch controller 130 determines the touch position P of the touch object 200 on the touch operation surface 110 according to the comparison result, so as to improve the determining accuracy of the touch position P.

Otherwise, details of the determining method of touch position described in this embodiment of the invention is sufficiently taught, suggested, and embodied in the embodiments illustrated in FIG. 1 to FIG. 4, and therefore no further description is provided herein.

Figure 6:
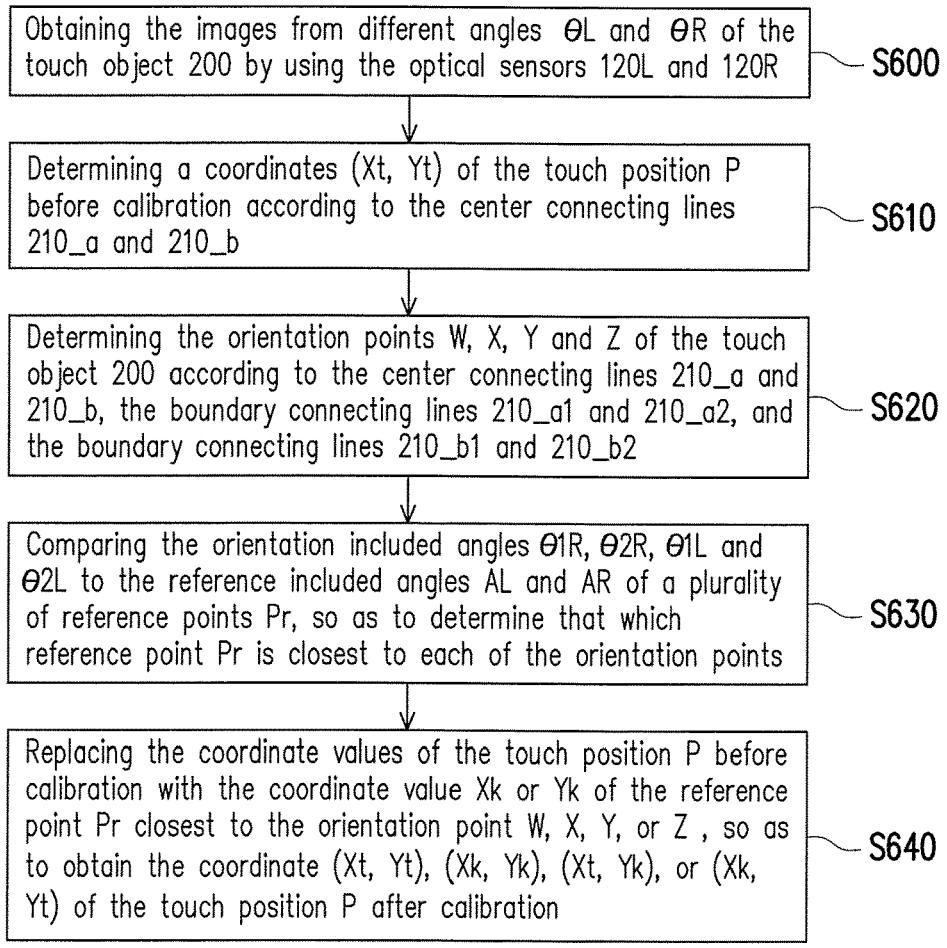
FIG. 6 is a flow chart of steps depicting a method for determining a touch position of another embodiment of the invention.

FIG. 6 is a flow chart of steps depicting a method for determining a touch position of another embodiment of the invention. Referring to FIGS. 1 to 4 and FIG. 6, the method for determining the touch position of the present embodiment is at least applicable to the optical touch apparatus 100 of the embodiment in FIGS. 1 to 4, so as to determine the touch position P of the touch object 200. In the present embodiment, in step S600, the touch controller 130 uses the optical sensors 120L and 120R to obtain the images from different angles θL and θR of the touch object 200. Subsequently, in step S610, the touch controller 130 determines a coordinate (Xt, Yt) of the touch position P before calibration according to the center connecting lines 210_$a$ and 210_$b$. In the present embodiment, the center connecting lines 210_$a$ and 210_$b$ are, for example, the connecting lines which connect the center of the touch object 200 to the second optical sensor 120R and the first optical sensor 120L respectively. Simultaneously, in step S620, the touch controller 130 determines the orientation points W, X, Y and Z of the touch object 200 according to the center connecting lines 210_$a$ and 210_$b$, the boundary connecting lines 210_$a$1 and 210_$a$2, and the boundary connecting lines 210_$b$1 and 210_$b$2. In the present embodiment, the boundary connecting lines 210_$a$1 and 210_$a$2, and the boundary connecting lines 210_$b$1 and 210_$b$2 are respectively based on the second optical sensor 120R and the first optical sensor 120L, and respectively form the orientation included angles θ1R and θ2R, θ1L and θ2L with a side of the touch operation surface 110.

After that, in step S630, the touch controller 130 compares the orientation included angles θ1R and θ2R, θ1L and θ2L to the reference included angles AL and AR of a plurality of reference points Pr, so as to determine that which reference point Pr is closest to each of the orientation points. Consequently, in step S640, the touch controller 130 may replace the coordinate values of the touch position P before calibration with the coordinate value Xk or Yk of the reference point Pr closest to the orientation point W, X, Y, or Z, so as to obtain the coordinate (Xt, Yt), (Xk, Yk), (Xt, Yk), or (Xk, Yt) of the touch position P after calibration.

Otherwise, details of the determining method of touch position described in this embodiment of the invention is sufficiently taught, suggested, and embodied in the embodiments illustrated in FIG. 1 to FIG. 5, and therefore no further description is provided herein.

In summary, in the exemplary embodiments of the invention, the touch controller performs the comparison according to the reference points and the orientation points which are determined by the images obtained by the optical sensors. The method is that comparing values of the orientation included angles and values of the reference included angles to determine the reference point closest to the orientation point in a plurality of reference points. Subsequently, the touch controller determines whether to replace the coordinate values of the touch position before calibration with the coordinate values of the reference point according to the comparison result, so as to obtain the coordinate of the touch position after calibration, and to improve the determining accuracy of the touch position.

Although the present invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. An optical touch apparatus, configured to sense a touch operation of a touch object, and the optical touch apparatus comprising:
   a touch operation surface, comprising a plurality of reference points, wherein the touch object performs the touch operation on the touch operation surface;
   a plurality of optical sensors, disposed on a side of the touch operation surface and configured to obtain a plurality of images of the touch object from different angles; and
   a touch controller, electrically connected to the optical sensors and configured to determine a plurality of orientation points according to the images,
   wherein the touch controller compares the orientation points to the reference points and determines a touch position of the touch object on the touch operation surface according to a comparison result,
   wherein the touch controller determines a plurality of boundary connecting lines at least connecting a boundary of the touch object and the optical sensors according to the images obtained by the optical sensors, and the orientation points are made by intersections of the boundary connecting lines from different pairs from the different optical sensors,
   wherein a pair of the boundary connecting lines which converge toward one of the optical sensors connect to two opposite sides of a boundary of the touch object, and another pair of the boundary connecting lines which converge toward another one of the optical sensors connect to another two opposite sides of the boundary of the touch object,
   wherein the orientation points comprises a plurality of first orientation points arranged along a first direction and a plurality of second orientation points arranged along a second direction, the touch controller determines a coordinate value of the touch position on the second direction according to the first orientation points, and the touch controller determines a coordinate value of the touch position on the first direction according to the second orientation points.

2. The optical touch apparatus as recited in claim 1, wherein each of the boundary connecting lines forms an orientation included angle with the side of the touch operation surface with respect to the corresponding optical sensor, a connecting line between each of the reference points and the corresponding optical sensor forms a reference included angle with the side of the touch operation surface, and the touch controller compares the orientation included angles to the reference included angles to determine the reference point closest to each of the orientation points.

3. The optical touch apparatus as recited in claim 2, wherein the optical sensors comprise:
   a first optical sensor, disposed on the side of the touch operation surface, wherein the touch controller determines a plurality of first boundary connecting lines of the touch object and the first optical sensor according to an image obtained by the first optical sensor; and
   a second optical sensor, disposed on the side of the touch operation surface, wherein the touch controller determines a plurality of second boundary connecting lines of the touch object and the second optical sensor according to an image obtained by the second optical sensor,
   wherein a plurality of intersection points of the first boundary connecting lines and the second boundary connecting lines comprise the orientation points.

4. The optical touch apparatus as recited in claim 3, wherein each of the first boundary connecting lines foul's a first orientation included angle with the side of the touch operation surface with respect to the first optical sensor, each of the second boundary connecting lines forms a second orientation included angle with the side of the touch operation surface with respect to the second optical sensor, and the touch controller compares the first orientation included angles to the reference included angles and compares the second orientation included angles to the reference included angles, so as to determine the reference point closest to each of the orientation points.

5. The optical touch apparatus as recited in claim 1, further comprising:
   a memory storage circuit, electrically connected to the touch controller, configured to store a position information of the reference points.

6. The optical touch apparatus as recited in claim 1, wherein the touch operation surface is a surface of one of a display, a television, a banner, and an electronic whiteboard.

7. A method for determining a touch position, configured to determine the touch position of a touch object, wherein an optical touch apparatus comprises a touch operation surface and a plurality of optical sensors, the method for determining the touch position comprising:
   obtaining a plurality of images from different angles of the touch object by using the optical sensors;
   determining a plurality of orientation points according to the images, and comparing the orientation points to a plurality of reference points; and
   determining the touch position of the touch object on the touch operation surface according to a comparison result,
   wherein the step of determining the orientation points according to the images and comparing the orientation points to the reference points comprises: determining a plurality of boundary connecting lines at least connecting a boundary of the touch object and the optical sensors according to the images obtained by the optical sensors, wherein the orientation points are made by intersections of the boundary connecting lines from different pairs from the different optical sensors,
   wherein a pair of the boundary connecting lines which converge toward one of the optical sensors connect to two opposite sides of a boundary of the touch object, and another pair of the boundary connecting lines which converge toward another one of the optical sensors connect to another two opposite sides of the boundary of the touch object;
   wherein the orientation points comprise a plurality of first orientation points arranged along a first direction and a plurality of second orientation points arranged along a second direction, the step of determining the touch position of the touch object on the touch operation surface according to the comparison result comprises:
   determining a coordinate value of the touch position on the second direction according to the first orientation points; and
   determining a coordinate value of the touch position on the first direction according to the second orientation points.

8. The method for determining the touch position as recited in claim 7, wherein each of the boundary connecting lines forms an orientation included angle with a side of the touch operation surface with respect to the corresponding optical sensor, a connecting line between each of the reference points and the corresponding optical sensor forms a reference included angle with the side of the touch operation surface, and the step of determining the orientation points according to the images and comparing the orientation points to the reference points comprises:
   comparing the orientation included angles to the reference included angles to determine the reference point closest to each of the orientation points.

9. The method for determining the touch position as recited in claim 8, wherein the optical sensors comprise a first optical sensor and a second optical sensor, and the step of determining the boundary connecting lines of the touch object and the optical sensors according to the images obtained by the optical sensors comprises:
   determining a plurality of first boundary connecting lines of the touch object and the first optical sensor according to an image obtained by the first optical sensor; and
   determining a plurality of second boundary connecting lines of the touch object and the second optical sensor according to an image obtained by the second optical sensor,
   wherein a plurality of intersection points of the first boundary connecting lines and the second boundary connecting lines comprise the orientation points.

10. The method for determining the touch position as recited in claim 9, wherein each of the first boundary connecting lines and the first optical sensor form a first orientation included angle, each of the second boundary connecting lines and the second optical sensor form a second orientation included angle, the step of comparing the orientation included angles to the reference included angles to determine the reference point closest to each of the orientation points comprises:
   comparing the first orientation included angles to the reference included angles, and comparing the second orientation included angles to the reference included angles, so as to determine the reference point closest to each of the orientation points.

11. The method for determining the touch position as recited in claim 7, wherein the optical touch apparatus further comprises a memory storage circuit, and the method for determining the touch position further comprises:
   storing a position information of the reference points in the memory storage circuit.

12. The method for determining the touch position as recited in claim 7, wherein the touch operation surface is a surface of one of a display, a television, a banner, and an electronic whiteboard.

* * * * *